(12) United States Patent
Lee et al.

(10) Patent No.: US 11,745,350 B2
(45) Date of Patent: Sep. 5, 2023

(54) CONTROL METHOD AND CONTROL SYSTEM OF MANIPULATOR

(71) Applicants: Hyundai Motor Company, Seoul (KR); Kia Motors Corporation, Seoul (KR)

(72) Inventors: Jae Ho Lee, Seoul (KR); Seok Won Lee, Chungcheongnam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 423 days.

(21) Appl. No.: 16/691,331

(22) Filed: Nov. 21, 2019

(65) Prior Publication Data

US 2020/0316781 A1    Oct. 8, 2020

(30) Foreign Application Priority Data

Apr. 2, 2019    (KR) .................. 10-2019-0038530

(51) Int. Cl.
| | | |
|---|---|---|
| *B25J 9/16* | (2006.01) | |
| *B25J 19/02* | (2006.01) | |
| *G06T 7/00* | (2017.01) | |
| *G06V 20/80* | (2022.01) | |

(52) U.S. Cl.
CPC ........... *B25J 9/1697* (2013.01); *B25J 9/1612* (2013.01); *B25J 19/023* (2013.01); *G06T 7/0002* (2013.01); *G06V 20/80* (2022.01)

(58) Field of Classification Search
CPC ............... B25J 9/16; B25J 19/02; G06T 7/00
See application file for complete search history.

(56) References Cited

U.S. PATENT DOCUMENTS

| | | | |
|---|---|---|---|
| 2007/0239315 A1* | 10/2007 | Sato ..................... | B25J 9/1612 |
| | | | 700/245 |
| 2011/0238207 A1* | 9/2011 | Bastian, II ............ | B65G 61/00 |
| | | | 700/217 |
| 2018/0050451 A1* | 2/2018 | Takanishi ............... | B25J 9/1653 |
| 2018/0147718 A1* | 5/2018 | Oleynik ................ | G05B 19/42 |
| 2018/0164788 A1* | 6/2018 | Shimamura ........... | B25J 9/0093 |
| 2018/0250813 A1* | 9/2018 | Shimodaira ............ | G06T 17/10 |
| 2018/0250821 A1* | 9/2018 | Shimodaira ........... | B25J 9/1669 |
| 2019/0016543 A1* | 1/2019 | Turpin .................. | B25J 19/023 |
| 2019/0039237 A1* | 2/2019 | Nakashima ........... | B25J 9/1669 |
| 2019/0077023 A1* | 3/2019 | Eto ........................ | B25J 13/083 |
| 2019/0217477 A1* | 7/2019 | Paepcke .............. | G05B 19/4189 |
| 2019/0308333 A1* | 10/2019 | Chen .................... | B25J 13/082 |

FOREIGN PATENT DOCUMENTS

| | | |
|---|---|---|
| KR | 10-2010-0020671 A | 2/2010 |
| KR | 10-2016-0070841 A | 6/2016 |
| KR | 10-2017-0030392 A | 3/2017 |
| KR | 10-2018-0122495 A | 11/2018 |

\* cited by examiner

*Primary Examiner* — Kira Nguyen
(74) *Attorney, Agent, or Firm* — Fox Rothschild LLP (57) ABSTRACT

A control method of a manipulator is provided. The method includes photographing a target using a camera and detected the target using the photographed data. A holding motion for the target is set based on the detected target and a robot is operated to hold the target based on the set holding motion.

15 Claims, 5 Drawing Sheets

CONTROL METHOD AND CONTROL SYSTEM OF MANIPULATOR

CROSS-REFERENCE TO RELATED APPLICATION

This application claims the priority benefit of Korean Patent Application No. 10-2019-0038530, filed on Apr. 2, 2019, the disclosure of which is incorporated herein by reference.

BACKGROUND

1. Field of the Invention

The present disclosure relates to a control method and control system of manipulator and, more particularly, to a technology that controls a robot to detect a target to hold and then controls the robot to hold the target.

2. Description of the Prior Art

A robot has been developed to provide various types of convenience for human and is, depending on the use, classified into an industrial robot that performs simple repetitive work and hard and dangerous work instead of human and an intellectual service robot that provides various types of convenience for normal life of human. The hands or arms of robots that have been developed in the related art are suitable for holding and carrying objects, but have a limit in accurately holding objects without a specified shape due to the limit in the arrangement of a manipulator that holds objects and the mechanical type that drives the manipulator. Accordingly, a method of installing a sensor on each finger of a manipulator and operating the manipulator based on the sensors has been studied, but this method has high cost.

The description provided above as a related art of the present disclosure is merely for helping understanding the background of the present disclosure and should not be construed as being included in the related art known by those skilled in the art.

SUMMARY

The present disclosure provides a method of operating a robot to detect a target using a camera and to appropriately hold the recognized target.

In view of the foregoing, a control method of a manipulator according to an aspect of the present disclosure may include: photographing a target using a camera and detecting the target using the photographed data; setting a holding motion for the target based on the recognized target; and operating a robot to hold the target based on the set holding motion.

The camera may be a Time of Flight (ToF) camera configured to capture an image of a target by transmitting and receiving pulses. In the detecting of the target, a three-dimensional (3D) image of the photographed target may be detected. In addition, the material of the photographed target may be detected. When the target is made of a plurality of materials, the materials and shapes formed by the materials may be separately detected. In addition, a property or mass of the target may be derived by comparing data of the photographed target with a database stored in advance. The property of the target may be strength, density, a modulus of elasticity, or a coefficient of friction according to the material of the target.

Further, in the setting of a holding motion for the target, an initial holding force or an initial holding posture may be set based on the detected target. The initial holding force may be set based on strength of the target and whether it is possible to hold the target from a side with an initial holding force may be determined based on mass and a modulus of elasticity of the target. When the target is not capable of being held with the initial holding force, an initial holding posture that supports weight of the target from the bottom may be set.

In the operating of a robot to hold the target, the motion of the robot may be adjusted in real time based on the set holding motion and a holding force that is applied by the robot may be adjusted to be or less than a maximum holding force for the detected target. The maximum holding force for the target may be determined based on strength according to the material of the detected target.

A control system of a manipulator according to another aspect of the present disclosure may include: a camera configured to capture an image of a target; a target recognizer configured to detect the target using data photographed or captured by the camera; a holding motion setter configured to set a holding motion for the target based on the target detected by the target recognizer; and a robot controller configured to operate a robot to hold the target based on the holding motion set by the holding motion setter. The camera may be a Time of Flight (ToF) camera including a transmitter that transmits pulses and a receiver that receives pulses reflected by the target, and using the pulses received by the receiver as data.

The system may further include a memory in which 3D images according to data or a database of materials may be stored in advance, and the target recognizer may be configured to derive properties or mass of the target by comparing the data of the photographed target with the database stored in advance in the memory. The robot operated by the robot controller may be a manipulator including a plurality of joints and a gripper at an end of the manipulator arms.

According to the control method and control system of manipulator of the present disclosure, it may be possible to estimate the mass, material, etc. of a target to hold using a camera. Accordingly, it may be possible to improve stability in holding control by setting in advance an initial holding posture and an initial holding force, whereby rapid holding control is possible.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

A specific structural or functional description of exemplary embodiments of the present disclosure disclosed in the specification or application is given merely for the purpose of describing the embodiment according to the present disclosure. Therefore, the exemplary embodiments according to the present disclosure may be implemented in various forms, and the present disclosure should not be construed as being limited to the exemplary embodiments described in the specification or application.

Various changes and modifications may be made to the exemplary embodiments according to the present disclosure, and therefore particular exemplary embodiments will be illustrated in the drawings and described in the specification or application. However, it should be understood that embodiments according to the concept of the present disclosure are not limited to the particular disclosed exemplary embodiments, but the present disclosure includes all modifications, equivalents, and alternatives falling within the spirit and scope of the present disclosure.

Although the terms "ordinal numbers" such as first, second and the like may be used to describe various elements, the elements should not be defined by the terms. The terms are merely used to distinguish an element from another element, and thus a first element may be named a second element while the second element may be similarly named the first element, without departing from the scope of protection according to the concept of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to other component, it should be understood that there is no component therebetween. The other expressions of describing a relation between structural elements, i.e. "between" and "merely between" or "neighboring" and "directly neighboring", should be interpreted similarly to the above description.

In the present specification, the terms are merely used to describe a specific exemplary embodiment, and are not intended to limit the present disclosure. As used herein, the singular forms are intended to include the plural forms as well, unless the context clearly indicates otherwise. Unless defined differently, all terms used herein, which include technical terminologies or scientific terminologies, have the same meaning as that generally understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning unless not clearly defined.

Hereinafter, an exemplary embodiment of the present disclosure will be described in detail with reference to the accompanying drawings. Similar reference numerals presented in the drawings denote similar elements.

Figure 1:
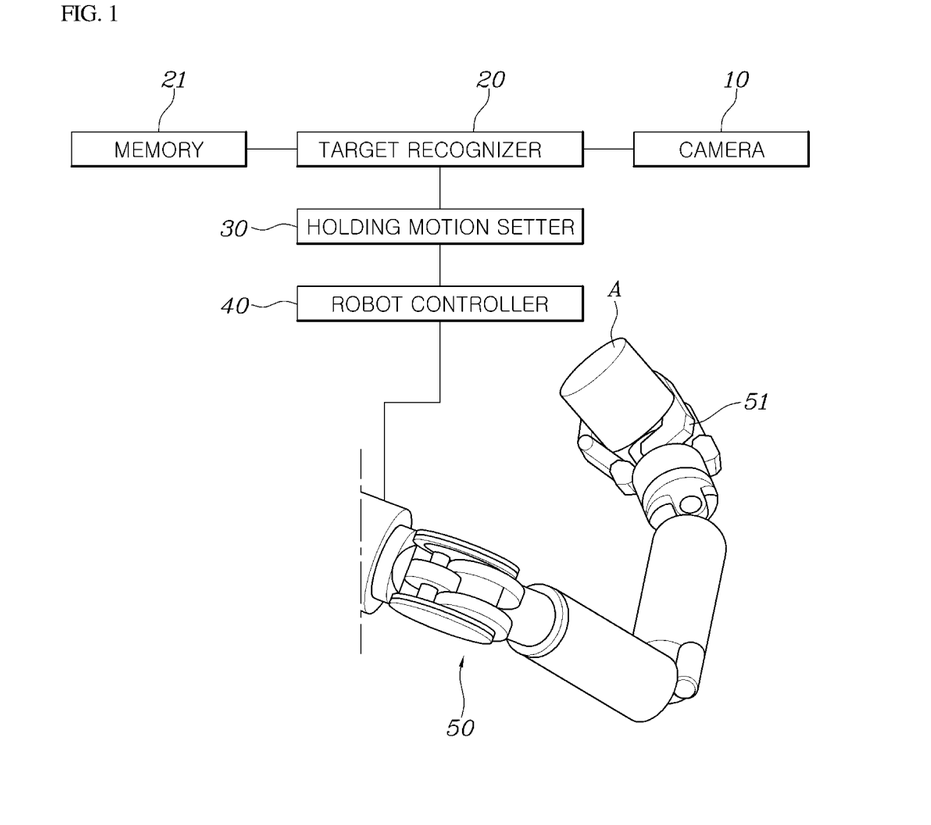
FIG. 1 is a view showing the configuration of a control system of a manipulator according to an exemplary embodiment of the present disclosure.
Figure 2:
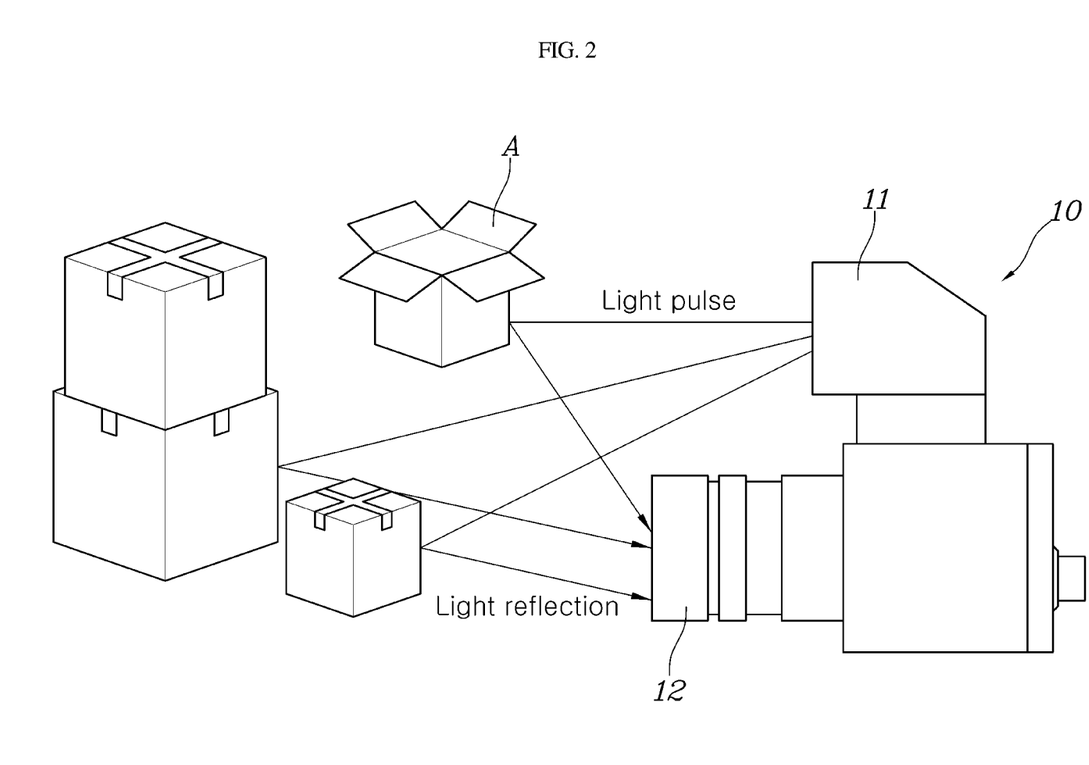
FIG. 2 is a view showing a camera of the control system of a manipulator according to an exemplary embodiment of the present disclosure.

FIG. 1 is a view showing the configuration of a control system of a manipulator according to an exemplary embodiment of the present disclosure and FIG. 2 is a view showing a camera 10 of the control system of manipulator according to an exemplary embodiment of the present disclosure. Referring to FIGS. 1 and 2, a control system of a manipulator according to an exemplary embodiment of the present disclosure may include: a camera 10 configured to capture an image of (e.g., photograph) a target A, a target recognizer 20 configured to detect the target A using data photographed or captured by the camera 10; a holding motion setter 30 configured to set a holding motion for the target A based on the target A detected by the target recognizer 20; and a robot controller 40 configured to operate a robot 50 to hold the target A based on the holding motion set by the holding motion setter 30.

In general, in order for a person a target A, the person typically visually detects the target A and then holds the target A while detecting the size of the target A and expected elasticity, strength, etc. of the target A. In particular, the person makes the motion of a hand to hold the target A different or generates a different initial holding force to apply to the target A based on the detected target A.

A technology of detected the target may also be applied to the robot 50 to accurately hold a target A having a non-specified shape in this way. In particular, it may be possible to obtain an effect that enables stable and rapid holding control by detecting a target A to hold using a vision system that captures pictures using the camera 10, setting an appropriate initial posture for holding the detected target A and the initial holding force to apply to the target A when holding the target A, and then operating the robot 50.

The camera 10 may be configured to photograph the target A and transmit photographed data to the target recognizer 20. The data may be image data obtained by the camera 10. In particular, the camera 10 may be configured to generate image data based on 3D distance information by 3-dimensionally photographing the target A. The target recognizer 20 may be configured to detect the target A using the data transmitted from the camera 10. In particular, the target recognizer 20 may be configured to detected properties based on the shape, volume, and material of the target A.

The holding motion setter 30 may be configured to set a holding motion for the target A based on the target A detected by the target recognizer 20. Particularly, the holding motion setter 30 may be configured to set a holding posture and a holding force for the target A. The robot controller 40 may be configured to operate the robot 50 to hold the target A based on the holding motion set by the holding motion setter 30. The robot 50 operated by the robot controller 40 refers to a manipulator. The manipulator 50 may include a gripper 51 having a plurality of joints to hold the target A at an end thereof. A driving device such as a motor that generates torque may be included in the joints included in the manipulator 50 and the robot controller 40 may be configured to adjust the operation of the driving device to operate the manipulator 50.

The target recognizer 20, the holding motion setter 30, and the robot controller 30 according to an exemplary embodiment of the present disclosure may be implemented through a nonvolatile memory (not shown) configured to store algorithms for executing operation of various components or data about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

In particular, the camera 10 may be a Time of Flight (ToF) camera 10 including a transmitter 11 that transmits pulses and a receiver 12 that receives pulses reflected by the target A, and using the pulses received by the receiver 12 as data. The ToF camera 10, configured to measure the depth of the target A by transmitting pulses having a modulation frequency to the target A and then receiving pulses reflected by the target A, may be configured to measure the depth of the target A using reflection time differences of the transmitted pulses. The receiver 12 may be configured to receive the pulses reflected by the target A and analyze the modulation frequency.

The ToF camera 10 may include the transmitter 11 and the receiver 12. For example, an infrared ray may be used as the pulse, an infrared light source may be used as the transmitter 11 and an infrared sensor may be used as the receiver 12. The ToF camera 10 may be configured to receive pulses transmitted from the transmitter 11 and reflected by a target and may be configured to extract data from the received pulses. The target recognizer 20 may be configured to detect the 3D shape of the target A using the input data.

The control system may further include a memory 21 in which 3D images according to data or a database of materials may be stored in advance. The target recognizer 20 may be configured to derive the properties or the mass of the target A by comparing the data of the photographed target A with the database stored in the memory 21. In particular, data of targets A may be learned and stored in the memory 21 and the target recognizer 20 may be configured to compare the shape of a target A detected using data photographed by the camera 10 with the database of the memory 21, thereby being able to determine what object the target A is.

The target recognizer 20 may be configured to detect the material of the target A using the data of the photographed target A. The pulses transmitted from the ToF camera and reflected by the target A are distorted based on the material of the target A. The material of the target A may derived by analyzing distortion of the pulses reflected by the target A using this principle. A database of distorted pulses according to various materials may be stored in the memory 21 and the target recognizer 20 may be configured to derive the material of the target A by comparing the data photographed using the camera 10 with the database of the memory 21.

Further, the properties of various materials may be stored in advance in the database of the memory 21. In particular, the properties of each material may include the strength, density, modulus of elasticity, a coefficient of friction, etc. of the material. Accordingly, the target recognizer 20 may be configured to detect the properties corresponding to the material of the target A from the database of the memory 21.

Figure 3:
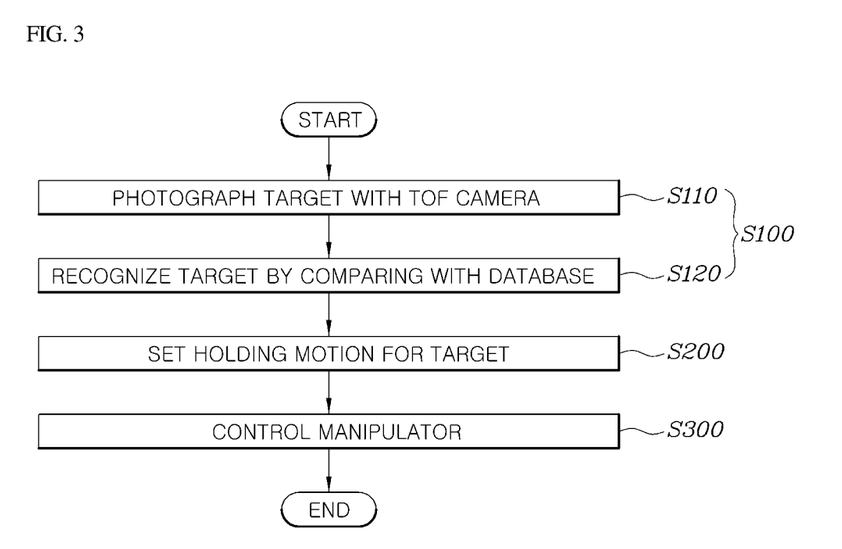
FIG. 3 is a flowchart showing a control method of a manipulator according to an exemplary embodiment of the present disclosure.

FIG. 3 is a flowchart showing a control method of a manipulator according to an exemplary embodiment of the present disclosure. The method described herein below may be executed by a controller. Referring further to FIG. 3, a control method of a manipulator according to an exemplary embodiment of the present disclosure may include: photographing a target A using the camera 10 and detecting the target A using the photographed data (S100); setting a holding motion for the target A based on the detecting target A (S200); and operating a robot to hold the target A based on the set holding motion (S300).

In the detecting of the target A (S100), an image data of the target A may be formed by photographing the target A using the camera 10 (S110) and the target A may be detected using the formed image data. In particular, in the detecting of the target A (S100), a 3D image of the photographed target A may be detected. The camera 10 may be a 3D camera 10 generating 3D image data for 3-dimensionally detection of the target A. For example, the camera 10 may be a ToF camera 10 configured to photograph the target A by transmitting and receiving pulses. The ToF camera 10 may be configured to detect the distance from the target A and the 3D shape of the target A using the time that the pulses transmitted from the transmitter 11 takes to be reflected by the target A and received by the receiver 12 (S110). Further, it may be possible to calculate the volume of the target A using the 3D shape of the detected target A.

Additionally, it may be possible to detect the object type of detected target A by comparing the 3D shape of the detected target A with the 3D images of objects stored in advance in a database (S120). For example, when the 3D shape of the target A is determined as being the same as a cup shape stored in advance in the database, as the result of comparison, the target A may be determined to be a cup. Further, in the detecting of the target A (S100), the material of the photographed target A may be detected. The pulses reflected by targets A and received by the receiver 12 have different distortion shapes, depending on materials. Accordingly, it may be possible to recognize the material of a target A by analyzing pulses reflected by the target A.

In particular, in the detecting of the target A (S100), when the target A is made of a plurality of materials, the materials and the shapes formed by the materials may be separately recognized. In other words, when a target A has a plurality of materials, it may be possible to separately detect shapes that corresponds to the materials and calculate the volumes of the materials. For example, when the target A is a cup with water therein, it may be possible to separately detect the shapes of the cup and the water and to separately calculate the volumes of the cup and the water. In the detecting of the target A (S100), it may be possible to derive the properties or the mass of the target A by comparing the data of the photographed target A with the database stored in advance (S120). The properties of materials may be stored in advance in the database.

Figure 4:
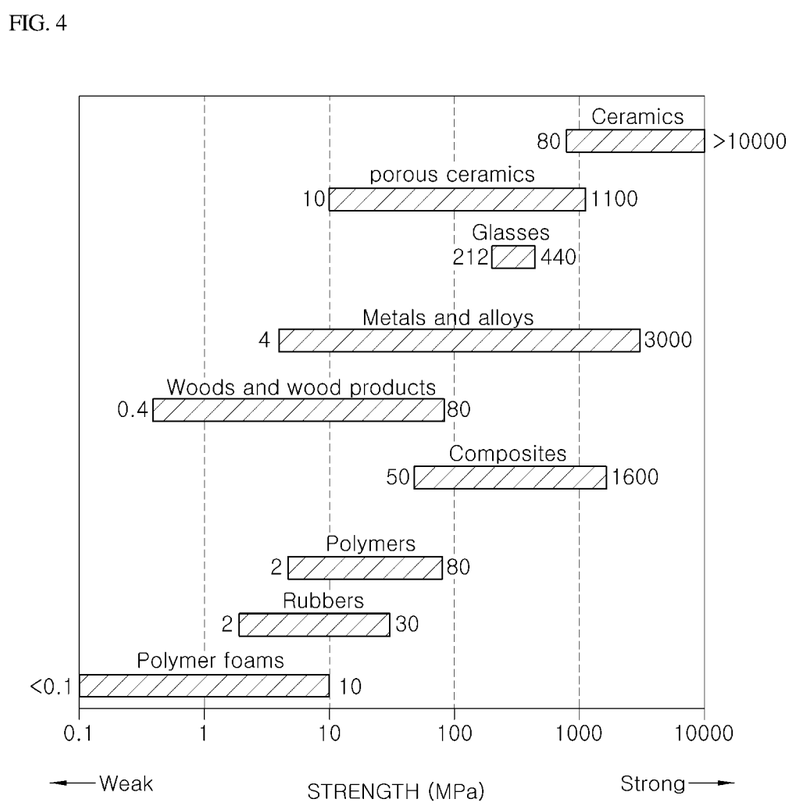
FIGS. 4 and 5 are view showing an example of a database according to an exemplary embodiment of the present disclosure.
Figure 5:
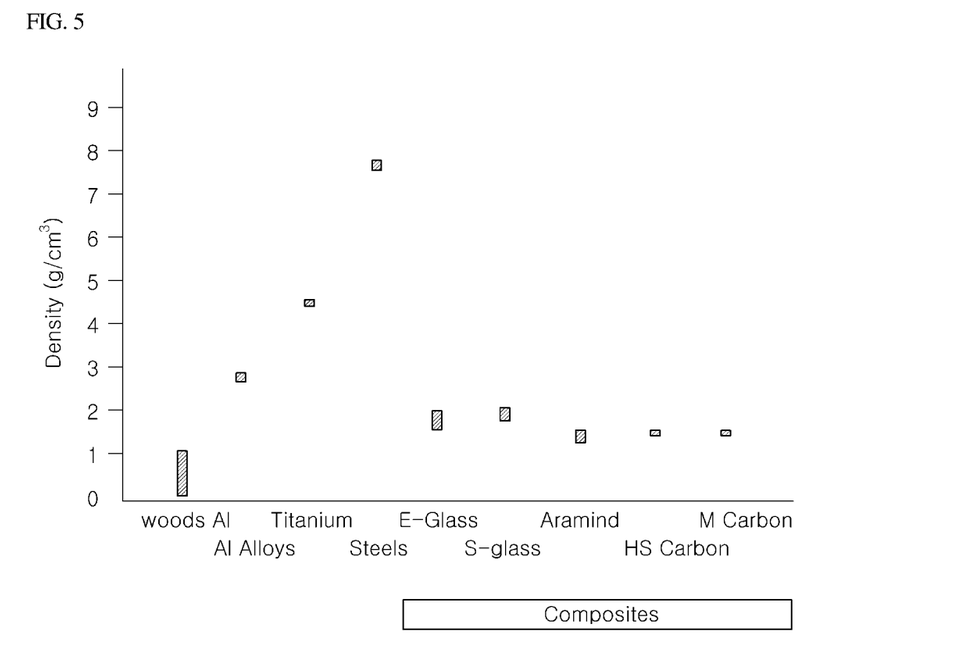

FIGS. 4 and 5 are view showing an example of a database according to an exemplary embodiment of the present disclosure. Referring further to FIGS. 4 and 5, a database according to an exemplary embodiment of the present disclosure may include properties including the density, strength, modulus of elasticity, coefficient of friction, etc. of materials. In the detecting of the target A (S100), it may be possible to recognize the material of the target A using the image data of the photographed target A and derive the properties corresponding to the recognized material.

Further, it may be possible to derive the mass of the target A by multiplying the volume of the target A by the density of the target A, in which the volume and mass are calculated from the image data of the target A. In other words, in the detecting of the target A (S100), it may be possible to detect the type of object of target A, calculate the volume of the target A, and drive the properties and the mass of the target A by detecting the material of the target A. In the setting of a holding motion for the target A (S200), a motion for the manipulator 50 to hold the target may be set to hold the recognized target A and the holding motion may include a holding posture and a holding force.

In general, the robot 50 may be controlled into the motion for holding the target A such that the holding force that is applied to the target A is gradually increased. Particularly, when applying a holding force to the target A, it may be possible to increase the holding force that is applied to the target A while receiving feedback regarding whether the target A is deformed, and it may also be possible to increase the holding force that is applied to the target A while receiving feedback about the motion of the robot according to a motion of picking up the target A.

In the setting of a holding motion for the target A (S200) according to an exemplary embodiment of the present disclosure, it may be possible to set an initial holding force or an initial holding posture based on the recognized target A. In other words, since the properties and mass according to the type and the material of the target A may be detected in advance, it may be possible to more rapidly control a holding motion by setting first the initial holding force and the initial holding posture of the robot for holding the target and then correspondingly operating the robot. In particular, in the setting of a holding motion for the target A (S200), it may be possible to set the initial holding force based on the strength of the target A.

The greater the strength of the target A, the greater the initial holding force may be set, while the smaller the strength of the target A, the smaller the initial holding force may be, which may be set based on a predetermined initial holding force map. In particular, the initial holding force may be appropriately set to prevent breaking or deforming the target A. Further, the initial holding force may be determined based on the strength and mass of the target A. For example, when the target A is a light paper cup with small strength, deformation of the target A may be prevented by setting a relatively small initial holding force. When the target A is a heavy metal cup with large strength, a relatively large initial force may be set, thereby reducing time for feedback control that increases the holding force, and thus, enabling rapid control.

Additionally, the time that is required to detect the shape of the target A, set the initial holding posture of the robot holding the target to correspond to the recognized shape of the target A, and operate the robot to hold the target A through feedback may be reduced, and thus more rapid control may be possible. Further, in the setting of a holding motion for the target A (S200), whether it is possible to hold the target A from a side with an initial holding force may be determined based on the mass and the modulus of elasticity of the target A. When it is impossible to hold the target with the initial holding force, an initial holding posture that supports the weight of the target A from the bottom may be set.

In other words, it may be possible to change the initial holding posture for holding targets A, based on the materials of the targets A. Considering the initial holding force determined in accordance with the strength of the target A and the mass and coefficient of friction of the target A, in response to determining that it is impossible to hold the target A even if applying an initial holding force from a side of the target A, the initial holding force may be set to support the target A from the bottom too. For example, when the target A is a paper cup with substantially light strength (e.g., light weight) but the mass is large due to water therein (e.g., the cup is heavy due to being filled with water), it may be determined that a holding posture that applies a holding force while holding the side of the target A is impossible, and thus, the initial posture may be set to hold the side of the target A and support the weight of the target A from the bottom.

In the setting of a holding motion for the target A (S200), it may be possible to set the initial holding force and the initial holding posture when operating the robot to hold the target A, based on the shape, type, and properties of the detected target A. For example, it may be possible to set a holding motion for the target A by changing the parameters for setting the initial holding force and the initial holding posture for controlling targets A, depend on each of the detected targets A.

In the operating of a robot to hold the target A (S300), it may be possible to operate the manipulator 50 to hold the target A based on the set holding motion. In particular, it may be possible to operate the gripper 51 to apply an initial holding force to the target A by adjusting and operating the joints of the manipulator 50 to move the gripper 51 at the end toward the target A and operating the joints of the gripper 51 such that the gripper 51 takes an initial holding posture. Further, in the operating of a robot to hold the target A (S300), it may be possible to execute the operation in real time based on the set holding motion such that the holding force that is applied by the robot is the maximum holding force for the detected target A or less.

Additionally, in the operating of a robot to hold the target A (S300), the robot may be initially operated in the set holding motion and feedback of the motion of the robot may be received in real time and thus, the robot may be operated in real time through feedback. Further, it may be possible to increase or decrease the holding force that is applied to the target A by the robot from the initial holding force, but the holding force may be adjusted under the maximum holding force. The maximum holding force for a target A may be set based on the detected target A. In particular, the maximum holding force may be set based on the properties according to the material of a target A, and thus, may be set in consideration of the type of the target A or the strength, modulus of elasticity, etc. according to the material of the target A.

Although the present disclosure has been described and illustrated with reference to the particular exemplary embodiments thereof, it will be apparent to those skilled in the art that various improvements and modifications of the present disclosure may be made without departing from the technical idea of the present disclosure provided by the following claims.

What is claimed is:

1. A control method of a manipulator, comprising:
capturing, by a controller, an image of a target by operating a camera and detecting the target using data of the captured image;
setting, by the controller, a holding motion for the target based on the detected target; and
operating, by the controller, a robot to hold the target based on the set holding motion,
wherein, in detecting the target, a plurality of properties of the target are derived by comparing data of the captured image of the target with a database stored in advance,
wherein the plurality of properties of the target are strength, a modulus of elasticity, and a coefficient of friction according to material of the target, and wherein, in setting the holding motion for the target, an initial holding force is set based on the strength of the detected target to inhibit prevent breaking or deforming the target.

2. The method of claim 1, wherein the camera is a Time of Flight (ToF) camera configured to photograph a target by transmitting and receiving pulses.

3. The method of claim 1, wherein, in detecting the target, a three-dimensional (3D) image of the captured target is detected.

4. The method of claim 1, wherein, in detecting the target, the material of the target is detected.

5. The method of claim 4, wherein, in detecting the target, when the target is made of a plurality of materials, the materials and shapes formed by the materials are separately detected.

6. The method of claim 1, wherein, in detecting the target, mass of the target is further derived by comparing data of the captured image of the target with a database stored in advance.

7. The method of claim 6, wherein the plurality of properties of the target further includes density according to the material of the target.

8. The method of claim 1, wherein, in setting the holding motion for the target, an initial holding posture is further set based on the detected target.

9. The method of claim 1, wherein, in the setting of a holding motion for the target, whether it is possible to hold the target from a side with an initial holding force is determined based on mass and a modulus of elasticity of the target, and when it is impossible to hold the target with the initial holding force, an initial holding posture that supports weight of the target from the bottom is set.

10. The method of claim 1, wherein, in operating the robot to hold the target, the motion of the robot is operated in real time based on the set holding motion and a holding force that is applied by the robot is adjusted to be or less than a maximum holding force for the detected target.

11. The method of claim 10, wherein the maximum holding force for the target is determined based on the strength according to the material of the detected target.

12. A control system of a manipulator, comprising:
a camera configured to photograph a target;
a target recognizer configured to detect the target using data photographed by the camera;
a holding motion setter configured to set a holding motion for the target based on the target detected by the target recognizer; and
a robot controller configured to operate a robot to hold the target based on the holding motion set by the holding motion setter, and
a memory in which three-dimensional (3D) images according to data or a database of materials is stored in advance, and the target recognizer is configured to derive properties of the target by comparing the data of the photographed target with the database stored in advance in the memory,
wherein the properties of the target are strength, a modulus of elasticity, and a coefficient of friction according to material of the target, and
wherein, in setting the holding motion for the target, an initial holding force is set based on the strength of the detected target to prevent breaking or deforming the target.

13. The system of claim 12, wherein the camera is a Time of Flight (ToF) camera including a transmitter that transmits pulses and a receiver that receives pulses reflected by the target, and using the pulses received by the receiver as data.

14. The system of claim 12, wherein:
the target recognizer is configured to further derive mass of the target by comparing the data of the photographed target with the database stored in advance in the memory.

15. The system of claim 12, wherein the robot that is operated by the robot controller is a manipulator including a plurality of joints and including a gripper at an end of the manipulator.

* * * * *